(12) United States Patent
Inoue et al.

(10) Patent No.: US 11,016,444 B2
(45) Date of Patent: May 25, 2021

(54) POINTER AND TIMEPIECE

(71) Applicant: CASIO COMPUTER CO., LTD., Tokyo (JP)

(72) Inventors: Kenichi Inoue, Hamura (JP); Masao Amano, Uenohara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 322 days.

(21) Appl. No.: 16/124,259

(22) Filed: Sep. 7, 2018

(65) Prior Publication Data
US 2019/0086868 A1 Mar. 21, 2019

(30) Foreign Application Priority Data

Sep. 15, 2017 (JP) .............................. JP2017-177905

(51) Int. Cl.
*G04B 19/04* (2006.01)
*G01D 13/22* (2006.01)
*B23K 26/362* (2014.01)
*B23K 26/361* (2014.01)

(52) U.S. Cl.
CPC ........... *G04B 19/042* (2013.01); *G01D 13/22* (2013.01); *B23K 26/361* (2015.10); *B23K 26/362* (2013.01)

(58) Field of Classification Search
CPC .... G04B 19/305; G04B 19/32; G04B 19/042; G01D 13/28; G01D 13/22
USPC ........................................................ 368/226
See application file for complete search history.

(56) References Cited

U.S. PATENT DOCUMENTS

| | | | | |
|---|---|---|---|---|
| 1,416,176 A | * | 5/1922 | Cuntz | G04B 19/32 368/226 |
| 4,371,429 A | | 2/1983 | Enomoto et al. | |
| 5,751,662 A | * | 5/1998 | Shaw | G04B 19/305 368/227 |
| 7,016,264 B2 | * | 3/2006 | Ueno | G04C 17/00 313/510 |
| 2003/0112712 A1 | * | 6/2003 | Ferri | G04B 19/042 368/238 |
| 2004/0089219 A1 | * | 5/2004 | Burau | G01D 13/28 116/288 |
| 2009/0086582 A1 | * | 4/2009 | Olmes | G04B 19/32 368/67 |

(Continued)

FOREIGN PATENT DOCUMENTS

| | | |
|---|---|---|
| CN | 203299524 U | 11/2013 |
| CN | 204403244 U | 6/2015 |
| JP | S61-39333 Y2 | 11/1986 |

(Continued)

OTHER PUBLICATIONS

First Office Action dated May 6, 2020 received in Chinese Patent Application No. CN 201811076790.6 together with an English language translation.

(Continued)

*Primary Examiner* — Edwin A. Leon
(74) *Attorney, Agent, or Firm* — Scully Scott Murphy & Presser

(57) ABSTRACT

A pointer including a pointer body constituted by a plate member, an engraved section provided in at least one of front and back surfaces of the pointer body excluding an edge of the pointer body, and a reinforcing section provided at the edge of the pointer body by the engraved section.

11 Claims, 10 Drawing Sheets

(56) References Cited

U.S. PATENT DOCUMENTS

2017/0261936 A1    9/2017   Charbon

FOREIGN PATENT DOCUMENTS

| JP | S63-79584 U | 5/1988 |
| JP | S63-37908 B2 | 7/1988 |
| JP | H04-095892 A | 3/1992 |
| JP | 2002-168971 A | 6/2002 |

OTHER PUBLICATIONS

Notification of Reasons for Refusal dated Sep. 3, 2019 received in Japanese Patent Application No. JP 2017-177905 together with an English language translation.
Second Office Action dated Dec. 29, 2020 received in Chinese Patent Application No. CN 201811076790.6 together with an English language translation.

* cited by examiner

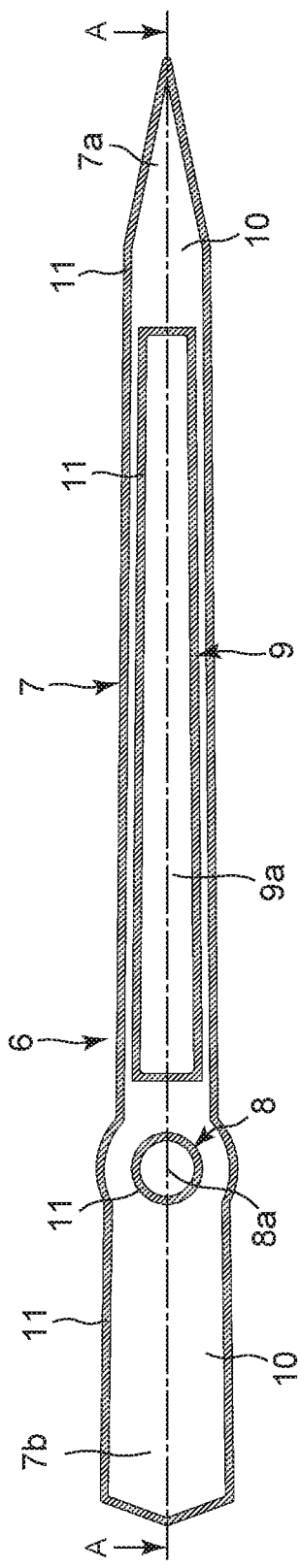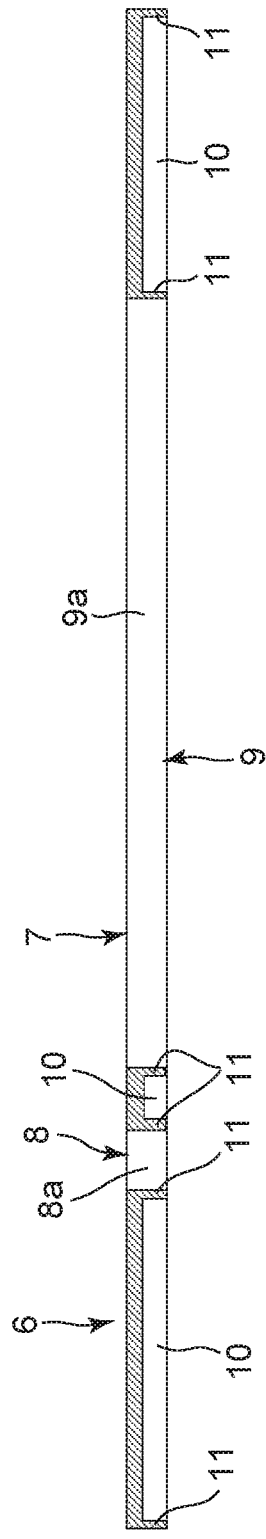

POINTER AND TIMEPIECE

CROSS-REFERENCE TO RELATED APPLICATION

This application is based upon and claims the benefit of priority from the prior Japanese Patent Application No. 2017-177905, filed Sep. 15, 2017, the entire contents of which are incorporated herein by reference.

BACKGROUND

1. Field of the Invention

The present invention relates to a pointer which is used in a wristwatch or a measuring instrument such as a meter and a timepiece having the same.

2. Description of the Related Art

For example, a pointer of a wristwatch is known which has a structure where a depressed section or a hole section serving as a decorative pattern is formed in a pointed body by a laser beam, as described in Japanese Patent Application Laid-Open (Kokai) Publication No. 04-095892.

With the structure of this wristwatch pointer where a depressed section or a hole section serving as a decorative pattern is provided in the pointed body, the weight of the pointed body can be reduced by the depressed section or the hole section. However, the strength of the pointer body cannot be ensured.

An object of the present invention is to provide a pointer whose weight can be made lighter and whose strength can be ensured and a timepiece having the same.

SUMMARY

In accordance with one embodiment, there is provided a pointer comprising: a pointer body constituted by a plate member; an engraved section provided in at least one of front and back surfaces of the pointer body excluding an edge of the pointer body; and a reinforcing section provided at the edge of the pointer body.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2A is an enlarged rear view of a pointer shown in FIG. 1;

FIG. 2B is an enlarged sectional view taken along line A-A in FIG. 2A;

DETAILED DESCRIPTION OF THE PREFERRED EMBODIMENTS

An embodiment applied to a wristwatch will hereinafter be described with reference to FIG. 1 to FIG. 3.

Figure 1:
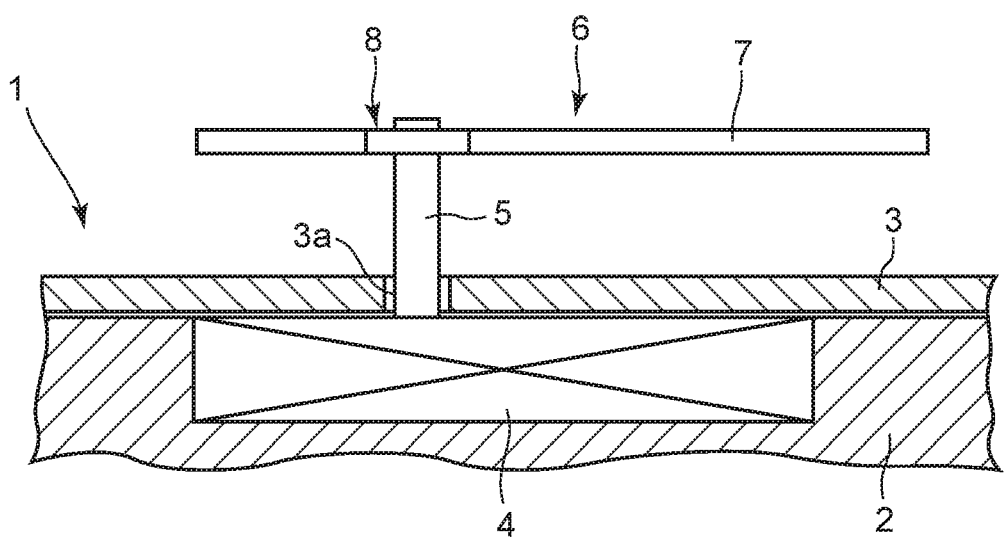
FIG. 1 is an enlarged sectional view showing main components of a timepiece module according to an embodiment in which the present invention has been applied to a wristwatch.

This wristwatch includes a timepiece module 1, as shown in FIG. 1. This timepiece module 1 is a module which is incorporated into a wristwatch case (not shown), and includes a housing 2. On the upper surface of the housing 2, a dial 3 is arranged. In the housing 2, a timepiece movement 4 is provided.

This timepiece movement 4 includes a pointer shaft 5 protruding toward a higher position than the dial 3 through a through-hole 3a of the dial 3, and is structured such that a pointer 6 is attached to the upper end of this pointer shaft 5, as shown in FIG. 1. By this structure, the timepiece movement 4 rotates the pointer shaft 5 so as to move the pointer 6 above the dial 3 and thereby indicate the time.

The pointer 6 includes a pointer body 7, as shown in FIG. 1, FIG. 2A and FIG. 2B. This pointer body 7 includes a pointer attachment section 8 that is referred to as "pipe", and a decorative section 9, and is structured such that the pointer attachment section 8 is attached to the upper end of the pointer shaft 5. The pointer body 7 is formed in a long narrow shape by a plate member made of a metal such as aluminum or brass.

That is, this pointer body 7 is formed such that one end serving as a leading end 7a (in FIG. 2A, the right end) has a tapered shape and the other end 7b (in FIG. 2A, the left end) has a wide shape, as shown in FIG. 2A and FIG. 2B. The pointer attachment section 8 is positioned at the center of the rotation of the pointer body 7 and includes, in a position closer to the other end 7b than a middle portion of the pointer body 7 in the longitudinal direction of the pointer body 7, a circular attachment hole 8a which is a circular opening provided penetrating through the front and back surfaces of the pointer body 7. The decorative section 9 includes a long hole 9a, which is an opening provided in an area between the leading end 7a of the pointer body 7 and the pointer attachment section 8.

In the back surface of this pointer body 7, an engraved section 10 is provided by laser processing except for the edge of the pointer body 7 located on the outer periphery of the pointer body 7, the edge of the attachment hole 8a of the pointer attachment section 8, and the edge of the long hole 9a of the decorative section 9, as shown in FIG. 2A and FIG. 2B. As a result, at the edge of the pointer body 7 located on the outer periphery of the pointer body 7, the edge of the attachment hole 8a of the pointer attachment section 8, and the edge of the long hole 9a of the decorative section 9, reinforcing sections 11 are formed as side walls, respectively.

Figure 3:
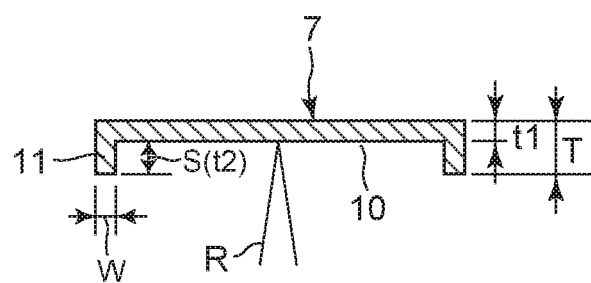
FIG. 3 is an enlarged sectional view showing main components of the pointer shown in FIG. 2A and FIG. 2B, in which the pointer is processed by a laser beam.

That is, the reinforcing sections 11 are formed in the shape of a frame at the edge of the pointer body 7 located on the outer periphery of the pointer body 7 so as to surround the pointer body 7, formed in the shape of a circular cylinder at the edge of the attachment hole 8a of the pointer attachment section 8 so as to surround the attachment hole 8a, and formed in the shape of a rectangular frame at the edge of the long hole 9a of the decorative section 9 so as to surround the long hole 9a, respectively, as shown in FIG. 2A, FIG. 2B and FIG. 3.

Further, the pointer body 7 is formed such that the thickness t1 of a portion of the pointer body 7 which corresponds to the engraved section 10 is less than half of the thickness T of the plate member of the pointer body 7 before the provision of the engraved section 10 (t1<T), as shown in FIG. 2A, FIG. 2B and FIG. 3. For example, the thickness t1 of the portion of the pointer body 7 which corresponds to the engraved section 10 is set to be a thickness that is approximately ½T to ⅘T of the thickness T of the plate member of the pointer body 7.

That is, in a case where the front surface of the pointer body 7 is a mirror-finished surface, the engraved section 10 of the pointer body 7 is set such that the thickness T of the plate member is 0.18 mm, the depth S of the engraved section 10 is 0.07 mm, and the thickness t1 of the portion of the pointer body 7 which corresponds to the engraved section 10 is 0.11 mm, in consideration of thermal damage that is caused by laser processing. This thickness t1 of the portion of the pointer body 7 which corresponds to the engraved section 10 is a critical thickness which is allowed in laser processing when the front surface of the pointer body 7 is a mirror-finished surface.

Further, in a case where the front surface of the pointer body 7 is not a mirror-finished surface, the engraved section 10 of the pointer body 7 is set such that the thickness T of the plate member is 0.13 mm, the depth S of the engraved section 10 is 0.05 mm, and the thickness t1 of the portion of the pointer body 7 which corresponds to the engraved section 10 is 0.08 mm, in consideration of thermal damage that is caused by laser processing. This thickness t1 of the portion of the pointer body 7 which corresponds to the engraved section 10 is a critical thickness which is allowed in laser processing when the front surface of the pointer body 7 is not a mirror-finished surface.

Accordingly, the reinforcing sections 11 are formed such that the length t2 (height) of the reinforcing sections 11 in the thickness direction of the pointer body 7 is the same as the depth S of the engraved section 10 of the pointer body 7 (t2=S), as shown in FIG. 2A, FIG. 2B and FIG. 3. Note that the engraved section 10 of the pointer body 7 should preferably be formed such that it becomes gradually deeper from the other end 7b of the pointer body 7 toward the leading end 7a that is one end of the pointer body 7 so that the center of the pointer attachment section 8, which is the center of rotation of the pointer body 7, serves as the position of the center of gravity of the pointer body 7.

Also, these reinforcing sections 11 are formed such that the length W (wall thickness) of the reinforcing sections 11 in the plane direction of the pointer body 7 is larger (W>t1) than the thickness t1 of the portion of the pointer body 7 which corresponds to the engraved section 10 and is equal to (W=T) or less (t1<W<T) than the thickness T of the plate member of the pointer body 7, as shown in FIG. 2A, FIG. 2B and FIG. 3. For example, the wall thickness W of the reinforcing sections 11 is approximately half (W=½T) of the thickness T of the plate member of the pointer body 7.

As a result, the pointer body 7 is structured such that the weight of the pointer body 7 as a whole is made lighter by the volume of the pointer body 7 as a whole being reduced by the engraving section 10, and is structured such that the strength of the pointer body 7 as a whole is ensured even though the thickness t1 of the pointer body 7 which corresponds to the engraved section 10 is thin, as shown in FIG. 2A and FIG. 2B.

Moreover, the pointer body 7 is structured such that its center of gravity is located at the center of the pointer attachment section 8 that is the center of rotation of the pointer body 7 by the long hole 9a of the decorative section 9, as shown in FIG. 2A and FIG. 2B. This pointer body 7 is also structured such that its center of gravity is located at the center of the pointer attachment section 8 that is the center of rotation of the pointer body 7 by the engraved section 10 being formed to become gradually deeper from the other end 7b of the pointer body 7 toward the leading end 7a that is one end of the pointer body 7.

Further, the pointer body 7 has a front surface subjected to a surface treatment. This surface treatment is a mirror finish, a brushed finish, a pear skin finish, or the like. In a case where the plate member of the pointer body 7 is made of aluminum, this surface treatment is an anodized aluminum treatment. In a case where the plate member of the pointer body 7 is made of a metal such as aluminum or brass, this surface treatment is plating such as gold plating or silver plating.

The decorative section 9 may have a luminous member (not shown) embedded in the long hole 9a. In that case, the luminous member is embedded such that the length of the luminous member from the upper surface of the long hole 9a, which is the front surface of the pointer body 7, to the lower end of the reinforcing section 11 is the same, e.g. approximately 0.15 mm to 0.2 mm, as the thickness T of the plate member of the pointer body 7.

Next, the manufacture of the pointer 6 is described.

First, the plate member made of a metal such as aluminum or brass is cut along the outer shape of the pointer body 7 by laser processing or press processing. Here, the attachment hole 8a of the pointer attachment section 8 and the long hole 9a of the decorative section 9 are simultaneously formed in the pointer body 7.

On the back surface of the plate member of the pointer body 7 cut out as described above, the engraved section 10 is formed by laser processing. Here, an area excluding the edge of the pointer body 7 located on the outer periphery of the pointer body 7, the edge of the attachment hole 8a of the pointer attachment section 8, and the edge of the long hole 9a of the decorative section 9 is scanned by irradiation with a laser beam R at constant energy, as shown in FIG. 2A, FIG. 2B and FIG. 3.

Here, the portion of the plate member which has been irradiated with the laser beam R instantaneously melts and scatters, whereby the engraved section 10 is formed. In this case, for the prevention of thermal damage such as oxidization of the front surface of the pointer body 7, it is desirable that the pointer body 7 be processed in an atmosphere of an inert gas such as argon, helium or nitrogen. This brings about an effect of cooling the front surface, which is a non-processed surface, of the pointer body 7.

Also, in passing the laser beam R while radiating it at constant energy, the laser beam R can be accurately and precisely passed by changing the angle of a mirror (not shown) little by little while irradiating the pointer body 7 by reflecting the laser beam R with the mirror. Accordingly, the engraved section 10 can be unfailingly and favorably formed with an accurate depth according to the passage of the laser beam R.

As a result, the engraved section 10 is formed with an uniform depth and, at the edge of the pointer body 7 located on the outer periphery of the pointer body 7, the edge of the attachment hole 8a of the pointer attachment section 8, and the edge of the long hole 9a of the decorative section 9, the reinforcing sections 11 are formed, respectively. Here, although the engraved section 10 of the pointer body 7 may be formed with a uniform depth S, it is desirable that the engraved section 10 be formed to become gradually deeper from the other end 7b of the pointer body 7 toward the leading end 7a that is one end of the pointer body 7.

Here, the reinforcing sections 11 are formed in the shape of a frame at the edge of the pointer body 7 located on the outer periphery of the pointer body 7 so as to surround the pointer body 7, formed in the shape of a circular cylinder at the edge of the attachment hole 8a of the pointer attachment section 8 so as to surround the attachment hole 8a, and formed in the shape of a rectangular frame at the edge of the long hole 9a of the decorative section 9 so as to surround the long hole 9a, respectively, as shown in FIG. 2A and FIG. 2B. In this state, even though the thickness t1 of the pointer body 7 is thin by the engraved section 10, the strength of the pointer body 7 as a whole is secured by the reinforcing sections 11.

Also, the pointer body 7 is structured such that its center of gravity is located at the center of the pointer attachment section 8 which is the center of rotation of the pointer body 7 by the long hole 9a of the decorative section 9. This pointer body 7 is also structured such that its center of gravity is located in the center of the pointer attachment section 8 which is the center of rotation of the pointer body 7 by the engraved section 10 of the pointer body 7 being formed to become gradually deeper from the other end 7b of the pointer body 7 toward the leading end 7a that is one end of the pointer body 7.

Further, when the pointer body 7 is to be subjected to a surface treatment, the surface treatment may be applied either before the engraved section 10 is formed in the pointer body 7 or after the engraved section 10 is formed in the pointer body 7. This surface treatment is a mirror finish, a brushed finish, a pear skin finish, or the like. In a case where the plate member of the pointer body 7 is made of aluminum, this surface treatment is an anodized aluminum treatment. In a case where the plate member of the pointer body 7 is made of a metal such as aluminum or brass, this surface treatment is plating such as gold plating or silver plating.

Next, the mechanism of this pointer 6 is described.

When this pointer 6 is to be attached to the pointer shaft 5 of the timepiece movement 4, the circular cylindrical reinforcing section 11 provided at the edge of the attachment hole 8a of the pointer attachment section 8 of the pointer body 7 is fitted into the upper end of the pointer shaft 5 from the side of the back surface of the pointer body 7. As a result, the pointer 6 is attached to the pointer shaft 5.

Here, even though the thickness t1 of the pointer body 7 is thin by the engraved section 10, the pointer 6 is unfailingly and firmly attached to the pointer shaft 5 because the strength of attachment to the pointer shaft 5 is secured by the circular cylindrical reinforcing section 11 provided at the edge of the attachment hole 8a of the pointer attachment section 8. As a result, the pointer 6 unfailingly and favorably rotates along with the rotation of the pointer shaft 5.

Further, by the long hole 9a of the decorative section 9 and the engraved section 10 that becomes gradually deeper from the other end 7b of the pointer body 7 toward the leading end 7a that is one end of the pointer body 7, the pointer body 7 is formed such the center of gravity of the pointer body 7 is located at the center of the pointer attachment section 8 which is the center of rotation of the pointer body 7. As a result, the pointer body 7 rotates on the pointer shaft 5 in a balanced manner.

Furthermore, by the engraved section 10 and the long hole 9a of the decorative section 9 being provided, the pointer body 7 has a reduced volume and a lighter weight, and its center of gravity is located at the center of the pointer attachment section 8. This reduces a load that is put on a motor of the timepiece movement 4 when the pointer body 7 rotates along with the rotation of the pointer shaft 5, and thereby achieves longer battery life.

As such, the pointer 6 of this wristwatch includes the pointer body 7 constituted by the plate member, the engraved section 10 provided in the back surface of this pointer body 7 except for the edge of the pointer body 7, and the reinforcing section 11 provided at the edge of the pointer body 7 by the engraved section 10, which makes it possible to make the weight of the pointer body 7 lighter and secure the strength of the pointer body 7. As a result, the pointer body 7 can be formed to have a larger width and length, and thereby can be formed larger in size.

That is, in the pointer 6, the engraved section 10 is provided in the pointer body 7, so that the volume of the pointer body 7 can be reduced. As a result, the weight of the pointer body 7 as a whole can be made lighter, whereby a reduction in the weight of the pointer body 7 as a whole can be achieved. This reduces a load on the motor of the timepiece movement 4 by the pointer body 7, and thereby achieves longer battery life.

Also, in this pointer 6, the reinforcing section 11 is provided at the outer peripheral edge of the pointer body 7. Therefore, even though the thickness t1 of the pointer body 7 is made thinner by the engraved section 10, the strength of the pointer body 7 as a whole can be secured. This makes it possible to unfailingly attach the pointer body 7 to the pointer shaft 5 and prevent the pointer body 7 from being deformed or twisted, and thereby allows the pointer body 7 to favorably move when the pointer body 7 is attached to the pointer shaft 5 and moves.

Moreover, in this pointer 6, the attachment hole 8a of the pointer attachment section 8 and the long hole 9a of the decorative section 9 are provided in the pointer body 7 and penetrate through the front and back surfaces of the pointer body 7. However, since the reinforcing sections 11 are provided at the edges of the attachment hole 8a of the pointer attachment section 8 and the long hole 9a of the decorative section 9, although the attachment hole 8a of the pointer attachment section 8 and the long hole 9a of the decorative section 9 are provided in the pointer body 7, the strength of the pointer body 7 as a whole can be secured by the reinforcing sections 11 provided at the edges of the attachment hole 8a of the pointer attachment section 8 and the long hole 9a of the decorative section 9.

Accordingly, in this pointer 6, the upper end of the pointer shaft 5 can be fitted into the circular cylindrical reinforcing section 11 provided at the edge of the attachment hole 8a of the pointer attachment section 8. Therefore, the pointer body 7 can be firmly attached to the pointer shaft 5. Also, in this pointer 6, the long hole 9a of the decorative section 9 makes it possible to achieve a further reduction in the weight of the pointer body 7 and improve the decoration and design.

Also, in the pointer body 7, the center of gravity of the pointer body 7 can be located at the center of the pointer attachment section 8 which is the center of rotation of the pointer body 7 by the long hole 9a of the decorative section 9. This allows the pointer body 7 to rotate on the pointer attachment section 8 in a balanced manner when the pointer body 7 is attached to the pointer shaft 5 and moves along with the rotation of the pointer shaft 5, and thereby achieves longer battery life.

Also, in this pointer 6, the depth S of the engraved section 10 is greater than half of the thickness T of the plate member of the pointer body 7 and is a depth of process limitation. Therefore, the thickness t1 of the pointer body 7 can be minimized. As a result, the weight of the pointer body 7 can be made to be further lighter, which achieve a further reduction in the weight of the pointer body 7.

Also, the pointer body 7 allows the center of gravity of the pointer body 7 to be located at the center of the pointer attachment section 8 which is the center of rotation of the pointer body 7 by the engraved section 10 being formed to become gradually deeper from the other end 7b of the pointer body 7 toward the leading end 7a that is one end of the pointer body 7. This also allows the pointer body 7 to rotate on the pointer attachment section 8 in a balanced manner.

Also, in this pointer 6, the wall thickness W of the reinforcing section 11 in the plane direction of the pointer body 7 is greater than the thickness t1 of the portion of the pointer body 7 which corresponds to the engraved section 10 and the same as or thinner than the thickness T of the plate member of the pointer body 7. Accordingly, even though the thickness t1 of the pointer body 7 is made thinner by the engraved section 10 being formed in the pointer body 7, the strength of the pointer body 7 can be sufficiently secured by the reinforcing sections 11, whereby the pointer body 7 can be unfailingly and favorably prevented from being deformed or twisted.

Moreover, in this pointer 6, the engraved section 10 is processed by the laser beam R that is an energy beam, whereby the engraved section 10 can be formed with a high degree of precision. That is, by passing the laser beam R while radiating it at constant energy, the engraved section 10 can be favorably formed with a uniform depth and the reinforcing sections 11 can be formed at the edge of the pointer body 7 located on the outer periphery of the pointer body 7, the edge of the attachment hole 8a of the pointer attachment section 8, and the edge of the long hole 9a of the decorative section 9, respectively.

Also, when the pointer body 7 is processed in an atmosphere of an inert gas such as argon, helium, or nitrogen in forming the engraved section 10 with the laser beam R, the inert gas brings about an effect of cooling the front surface of the pointer body 7 that is a non-processed surface. Therefore, thermal damage such as oxidization of the front surface of the pointer body 7 can be prevented, so that the pointer body 7 can be processed with a higher degree of precision.

Also, in passing the laser beam R while radiating it at constant energy, the laser beam R can be accurately passed simply by changing the angle of a mirror (not shown) while irradiating the pointer body 7 by reflecting the laser beam R with the mirror. As a result, the laser beam R can be easily controlled, which also makes it possible to process the pointer body 7 with a high degree of precision.

Also, in this pointer 6, the design can be enhanced by subjecting the pointer body 7 to a surface treatment. This surface treatment is a mirror finish, a brushed finish, a pear skin finish, or the like. In a case where the plate member of the pointer body 7 is made of aluminum, this surface treatment is an anodized aluminum treatment. In a case where the plate member of the pointer body 7 is made of a metal such as aluminum or brass, this surface treatment is plating such as gold plating or silver plating. These surface treatments ensure excellent corrosion resistance for the pointer 6, and enhance the decoration of the pointer 6.

In the above-described embodiment, the reinforcing sections 11 are provided at the edge of the pointer body 7 located on the outer periphery of the pointer body 7, the edge of the attachment hole 8a of the pointer attachment section 8, and the edge of the long hole 9a of the decorative section 9, respectively. However, the present invention is not limited thereto. For example, reinforcing sections 11 may be provided in the pointer body 7 as in the case of a first modification shown in FIG. 4A and FIG. 4B, a second modification shown in FIG. 5A and FIG. 5B, or a third modification shown in FIG. 6A and FIG. 6B.

Figure 4A:
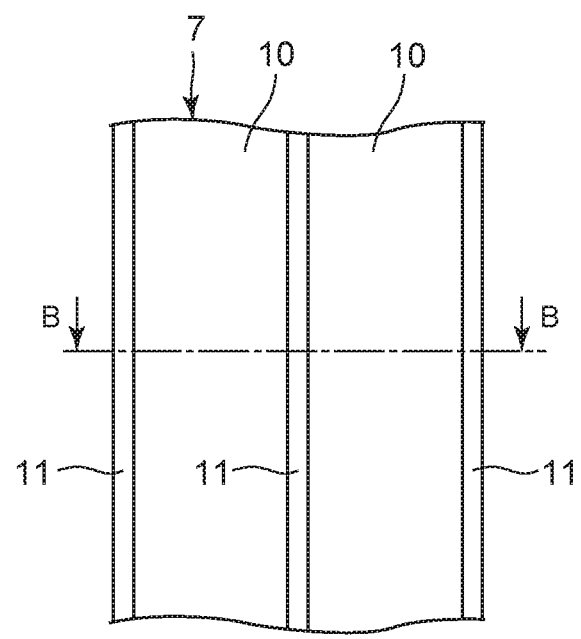
FIG. 4A is an enlarged rear view showing main components of a pointer according to a first modification to which the present invention has been applied.
Figure 4B:
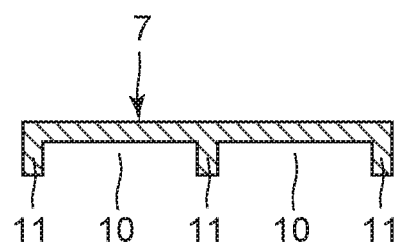
FIG. 4B is an enlarged sectional view taken along line B-B in FIG. 4A.

That is, the reinforcing sections 11 of the first modification shown in FIG. 4A and FIG. 4B are provided not only at the edge of the pointer body 7 located on the outer periphery of the pointer body 7 but also in a middle portion of the pointer body 7 in the width direction orthogonal to the longitudinal direction of the pointer body 7 along the longitudinal direction of the pointer body 7. By the pointer body 7 being provided with the reinforcing sections 11, the strength of the pointer body 7 can be further enhanced than that in the above-described embodiment.

Figure 5A:
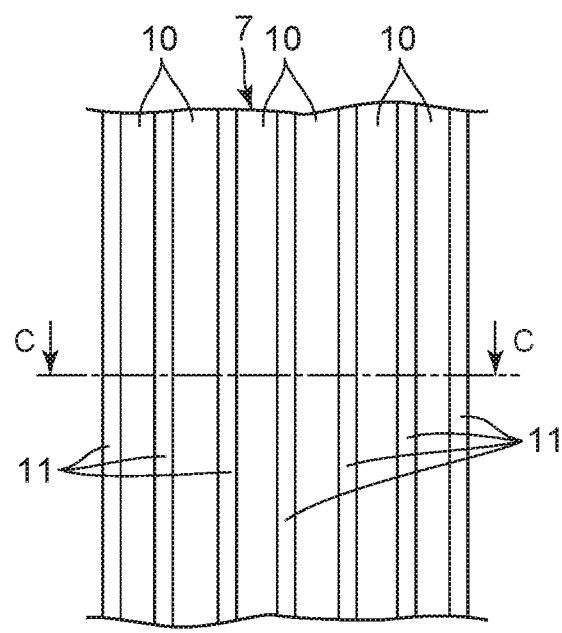
FIG. 5A is an enlarged rear view showing main components of a pointer according to a second modification to which the present invention has been applied.
Figure 5B:
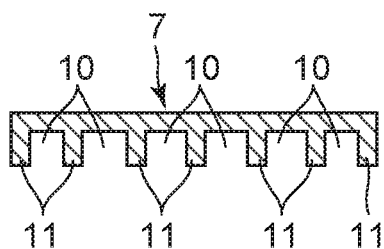
FIG. 5B is an enlarged sectional view taken along line C-C in FIG. 5A.

Also, the reinforcing sections 11 of the second modification shown in FIG. 5A and FIG. 5B are not only provided at the edge of the pointer body 7 located on the outer periphery of the pointer body 7 but also provided in the form of a plurality of streaks placed at predetermined intervals in the width direction orthogonal to the longitudinal direction of the pointer body 7 along the longitudinal direction of the pointer body 7. By the reinforcing sections 11 being provided in the form of a plurality of streaks placed at predetermined intervals in the width direction of the pointer body 7, the strength of the pointer body 7 can be further enhanced than that in the above-described first modification.

Figure 6A:
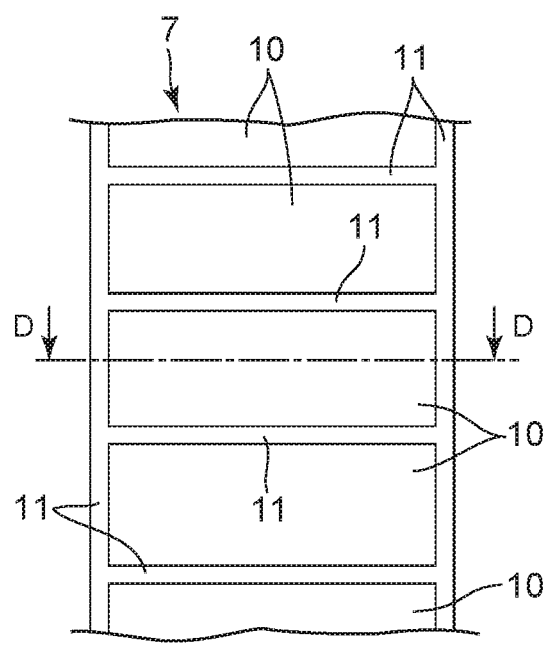
FIG. 6A is an enlarged rear view showing main components of a pointer according to a third modification to which the present invention has been applied.
Figure 6B:
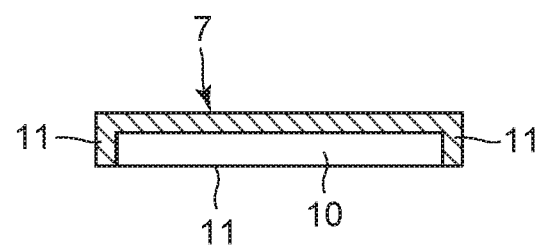
FIG. 6B is an enlarged sectional view taken along line D-D in FIG. 6A.

Furthermore, the reinforcing sections 11 of the third modification shown in FIG. 6A and FIG. 6B are not only provided at the edge of the pointer body 7 located on the outer periphery of the pointer body 7 but also provided in the form of a plurality of streaks placed at predetermined intervals in the longitudinal direction of the pointer body 7 along the width direction orthogonal to the longitudinal direction of the pointer body 7. By the reinforcing sections 11 being provided in the form of a plurality of streaks placed at predetermined intervals in the longitudinal direction of the pointer body 7, the strength of the pointer body 7 can be further enhanced than that in the above-described embodiment.

In the above-described embodiment and the above-described first to third modifications, the engraved section 10 provided in the back surface of the pointer body 7 has the shape of a flat depressed section. However, the present invention is not limited thereto. For example, an engraved section in a fourth modification shown in FIG. 7, a fifth modification shown in FIG. 8, or a sixth modification shown in FIG. 9 may be formed in the pointer body 7.

Figure 7:
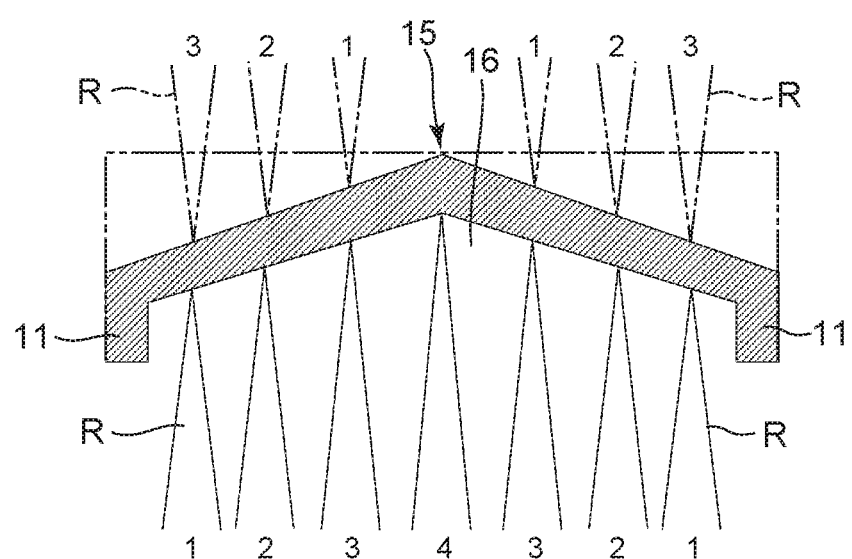
FIG. 7 is an enlarged sectional view showing main components of a pointer according to a fourth modification to which the present invention has been applied, in which the pointer is processed by a laser beam.

That is, in the fourth modification shown in FIG. 7, an engraved section 16 of a pointer body 15 is formed in a mountain shape deeply engraved in a middle portion of the pointer body 15 in the width direction orthogonal to the longitudinal direction of the pointer body 15. In this case, in forming the engraved section 16 in the back surface of the pointer body 15 with a laser beam R, it is only necessary to pass the laser beam R while changing energy of the laser beam R.

For example, in passing the laser beam R along the width direction of the pointer body 15, the engraved section 16 is formed to be gradually deeper by the energy of the laser beam R being controlled to be gradually stronger (level 1 to level 4) from the reinforcing section 11 at the edge of one end side (in FIG. 7, the left end side) of the pointer body 15 toward the middle portion of the pointer body 15.

Then, the engraved section 16 is formed to be gradually shallower by the energy of the laser beam R being controlled to be gradually weaker (level 3 to level 1) from the middle portion of the pointer body 15 toward the reinforcing section 11 at the edge of the other end side (in FIG. 7, the right end side) of the pointer body 15. As a result, the mountain-shaped engraved section 16 that is deepest at the middle portion is formed in the back surface of the pointer body 15.

Further, in forming the upper surface, i.e. the front surface of the pointer body 15 into a mountain shape, the energy of the laser beam R is controlled to be gradually weaker (level 3 to level 0) from the edge of one end side (in FIG. 7, the left end side) of the pointer body 15 toward the middle portion of the pointer body 15 when the laser beam R is passed along the width direction of the pointer body 15 of the plate member. Then, the energy of the laser beam R is controlled to be gradually stronger (level 0 to level 3) from the middle portion of the pointer body 15 toward the edge of the other end side (in FIG. 7, the right end side) of the pointer body 15. As a result, the upper surface, i.e. the front surface of the pointer body 15 is formed into a mountain shape.

Figure 8:
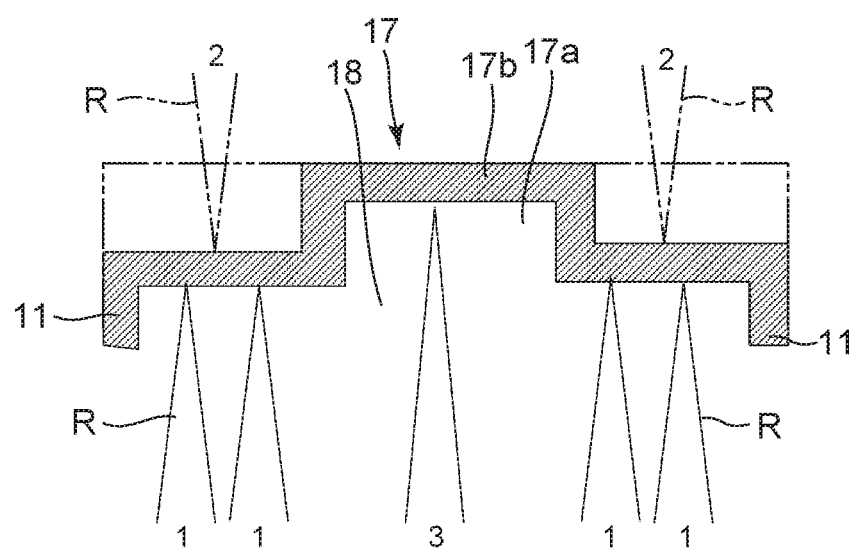
FIG. 8 is an enlarged sectional view showing main components of a pointer according to a fifth modification to which the present invention has been applied, in which the pointer is processed by a laser beam.

Further, in the fifth embodiment shown in FIG. 8, an engraved section 18 of a pointer body 17 is formed in a stepped shape deeply engraved in a middle portion of the pointer body 17 in the width direction orthogonal to the longitudinal direction of the pointer body 17. In this case as well, in forming the engraved section 18 in the back surface of the pointer body 18 with a laser beam R, it is only necessary to pass the laser beam R while changing energy of the laser beam R.

For example, in passing the laser beam R along the width direction of the pointer body 17, the laser beam R is equally radiated at a constant intensity (level 1) of energy of the laser beam R from the reinforcing section 11 at the edge of one end side (in FIG. 8, the left end side) of the pointer body 17 to one end (in FIG. 8, the left end) of a depressed section 17a in the middle portion of the pointer body 17. Then, at timing at which the laser beam R has reached one end of the depressed section 17a in the middle portion of the pointer body 17, the laser beam R is equally radiated at a higher intensity (level 3) of energy of the laser beam R.

Then, the laser beam R is equally radiated again at a constant intensity (level 1) of energy of the laser beam R from the other end (in FIG. 8, the right end) of the depressed section 17a to the reinforcing section 11 at the edge of the other end side (in FIG. 8, the right end side) of the pointer body 17. As a result, the engraved section 18 whose middle portion is deeply depressed is formed in the back surface of the pointer body 17.

Further, in forming a raised section 17b on the upper surface, i.e. the front surface of the pointer body 17, the laser beam R is equally radiated at a constant intensity (level 2) of energy of the laser beam R from the edge of one end side (in FIG. 8, the left end side) of the pointer body 17 to one end (in FIG. 8, the left end) of the raised section 17b in the middle portion of the pointer body 17 when the laser beam R is passed along the width direction of the pointer body 17 of the plate member.

Then, the laser beam R is equally radiated at a constant intensity (level 2) of energy of the laser beam R from the other end (in FIG. 8, the right end side) of the raised section 17b of the pointer body 17 to the edge of the other end side (in FIG. 8, the right end side) of the pointer body 17. As a result, the raised section 17b is formed on the upper surface, i.e. the front surface of the pointer body 17.

Figure 9:
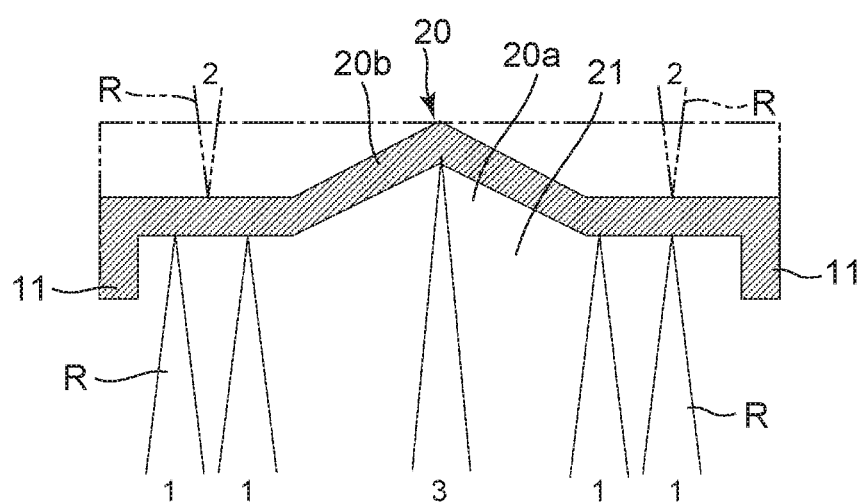
FIG. 9 is an enlarged sectional view showing main components of a pointer according to a sixth modification to which the present invention has been applied, in which the pointer is processed by a laser beam.

Also, in the sixth modification shown in FIG. 9, an engraved section 21 of a pointer body 20 is formed in such a shape that a mountain-shaped depressed section 20a is deeply engraved in a middle portion of the pointer body 20 in the width direction orthogonal to the longitudinal direction of the pointer body 20. In this case as well, in forming the engraved section 21 in the back surface of the pointer body 20 with a laser beam R, it is only necessary to pass the laser beam R while changing energy of the laser beam R.

For example, in passing the laser beam R along the width direction of the pointer body 20, the laser beam R is equally radiated at a constant intensity (level 1) of energy of the laser beam R from the reinforcing section 11 at the edge of one end side (in FIG. 9, the left end side) of the pointer body 20 to one end (in FIG. 9, the left end) of the depressed section 20a in the middle portion of the pointer body 20.

Then, the engraved section 21 is formed to be gradually deeper toward a middle portion of the depressed section 20a by the energy of the laser beam R being controlled to be gradually stronger (level 1 to level 3) from timing at which the laser beam R has reached one end of the depressed section 20a in the middle portion of the pointer body 20. Then, the engraved section 21 is formed to be gradually shallower by the energy of the laser beam R being controlled to be gradually weaker (level 3 to level 1) from the middle portion of the pointer body 20 in the depressed section 20a toward the other end (in FIG. 9, the right end) of the depressed section 20a.

Then, the laser beam R is equally radiated with the energy of the laser beam R being maintained at a constant intensity (level 1) from the other end (in FIG. 9, the right end side) of the depressed section 20a toward the reinforcing section 11 at the edge of the other end side (in FIG. 9, the right end side) of the pointer body 20. As a result, the engraved section 21 whose middle portion is deeply depressed in a mountain shape is formed in the back surface of the pointer body 20.

Further, in forming a raised section 20b on the upper surface, i.e. the front surface of the pointer body 20, the laser beam R is equally radiated at a constant intensity (level 2) of energy of the laser beam R from the edge of one end side (in FIG. 9, the left end side) of the pointer body 20 to one end (in FIG. 9, the left end) of the raised section 20b in the middle portion of the pointer body 20 when the laser beam R is passed along the width direction of the pointer body 20 of the plate member.

Then, the energy of the laser beam R is controlled to be gradually weaker (level 2 to level 0) from timing at which the laser beam R has reached one end of the raised section 20b of the pointer body 20. Then, the energy of the laser beam R is controlled to be gradually stronger (level 0 to level 2) from the top of the raised section 20b of the pointer body 20 toward the other end (in FIG. 9, the right end side) of the raised section 20b.

Then, the laser beam R is equally radiated with the energy of the laser beam R being maintained at a constant intensity (level 2) from the other end side (in FIG. 9, the right end side) of the raised section 20b toward the edge of the other end (in FIG. 9, the right end) of the pointer body 20. As a result, the mountain-shaped raised section 20b is formed on the upper surface, i.e. the front surface of the pointer body 20.

Also, the present invention is not limited to the above-described embodiment or any of the above-described first to sixth modifications. For example, a pointer body may be formed as shown in a seventh modification in FIG. 10A or an eighth modification in FIG. 10B.

Figure 10A:
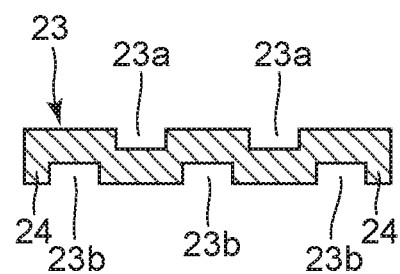
FIG. 10A is an enlarged sectional view showing main components of a pointer according to a seventh modification to which the present invention has been applied.

That is, the seventh modification shown in FIG. 10A is structured such that engraved sections 23a and 23b are provided in the front and back surfaces of a pointer body 23. That is, this pointer body 23 has a reinforcing section 24 provided at the edge of the back surface located on the outer periphery, two engraved sections 23a provided on the front surface of the pointer body 23 in the form of grooves extending along the longitudinal direction of the pointer body 23, and three engraved sections 23b provided on the back surface of the pointer body 23 in the form of grooves extending along the longitudinal direction of the pointer body 23.

Further, the two engraved sections 23a in the front surface of the pointer body 23 and the three engraved sections 23b in the back surface of the pointer body 23 are provided in positions shifted from one another. Even when the engraved sections 23a and 23b are provided in the front and back surfaces of the pointer body 23 as described above, substantially the same working effects as the above-described embodiment can be acquired. In addition, by the engraved sections 23a and 23b, the design of the front and back surfaces of the pointer body 23 can be enhanced.

Figure 10B:
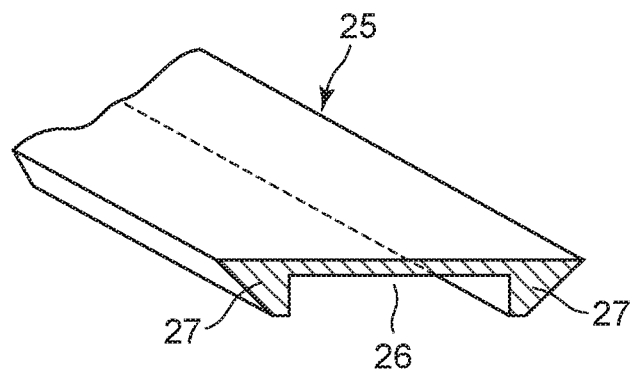
FIG. 10B is an enlarged perspective view showing main components of a pointer according to an eighth modification to which the present invention has been applied.

Further, a pointer body 25 of the eighth modification shown in FIG. 10B is structured such that, by an engraved section 26 being provided in the back surface of the pointer body 25, a reinforcing section 27 is provided at the edge of the pointer body 25 located on the outer periphery of the pointer body 25, and the outside surface of this reinforcing section 27 is formed in an undercut shape. A cross-sectional shape of this engraved section 26 may conform with the undercut shape of the outside surface of the reinforcing section 27. That is, in this pointer body 25, the outside surface of the reinforcing section 27 is inclined so that the wall thickness of the reinforcing section 27 gradually increases from the lower end of the reinforcing section 27 toward the upper surface, i.e. the front surface of the pointer body 25. As a result, the pointer body 25 has a sharp shape, so that the design of the pointer body 25 can be enhanced.

In the above-described embodiment and its modifications, the present invention has been applied to a pointer-type wristwatch. However, the present invention is not necessarily required to be applied to a wristwatch. For example, the present invention is applicable to various types of pointer-type timepieces such as a travel watch, an alarm clock, a table clock, and a wall clock. Further, the present invention is not necessarily required to be applied to a timepiece. For example, the present invention is also applicable to a measuring instrument such as a meter.

While the present invention has been described with reference to the preferred embodiments, it is intended that the invention be not limited by any of the details of the description therein but includes all the embodiments which fall within the scope of the appended claims.

What is claimed is:

1. A pointer comprising:
a pointer body comprising a plate member;
an engraved section provided in at least one of front and back surfaces of the pointer body excluding an edge of the pointer body; and
a reinforcing section provided at the edge of the pointer body,
wherein the reinforcing section is formed such that a wall thickness of the reinforcing section in a plane direction of the pointer body is greater than a thickness of a portion of the pointer body which corresponds to the engraved section and is equal to or less than a thickness of the plate member of the pointer body.

2. The pointer according to claim 1, wherein the pointer body has an opening provided penetrating through the front and back surfaces, and the reinforcing section is provided at an edge of the opening.

3. The pointer according to claim 1, wherein the engraved section is formed such that a depth thereof is greater than half of the thickness of the plate member of the pointer body.

4. The pointer according to claim 2, wherein the engraved section is formed such that a depth thereof is greater than half of the thickness of the plate member of the pointer body.

5. The pointer according to claim 1, wherein the engraved section is processed by an energy beam.

6. The pointer according to claim 2, wherein the engraved section is processed by an energy beam.

7. The pointer according to claim 3, wherein the engraved section is processed by an energy beam.

8. The pointer according to claim 4, wherein the engraved section is processed by an energy beam.

9. A timepiece comprising the pointer according to claim 1.

10. A timepiece comprising the pointer according to claim 2.

11. A timepiece comprising the pointer according to claim 3.

* * * * *